Figure 1:
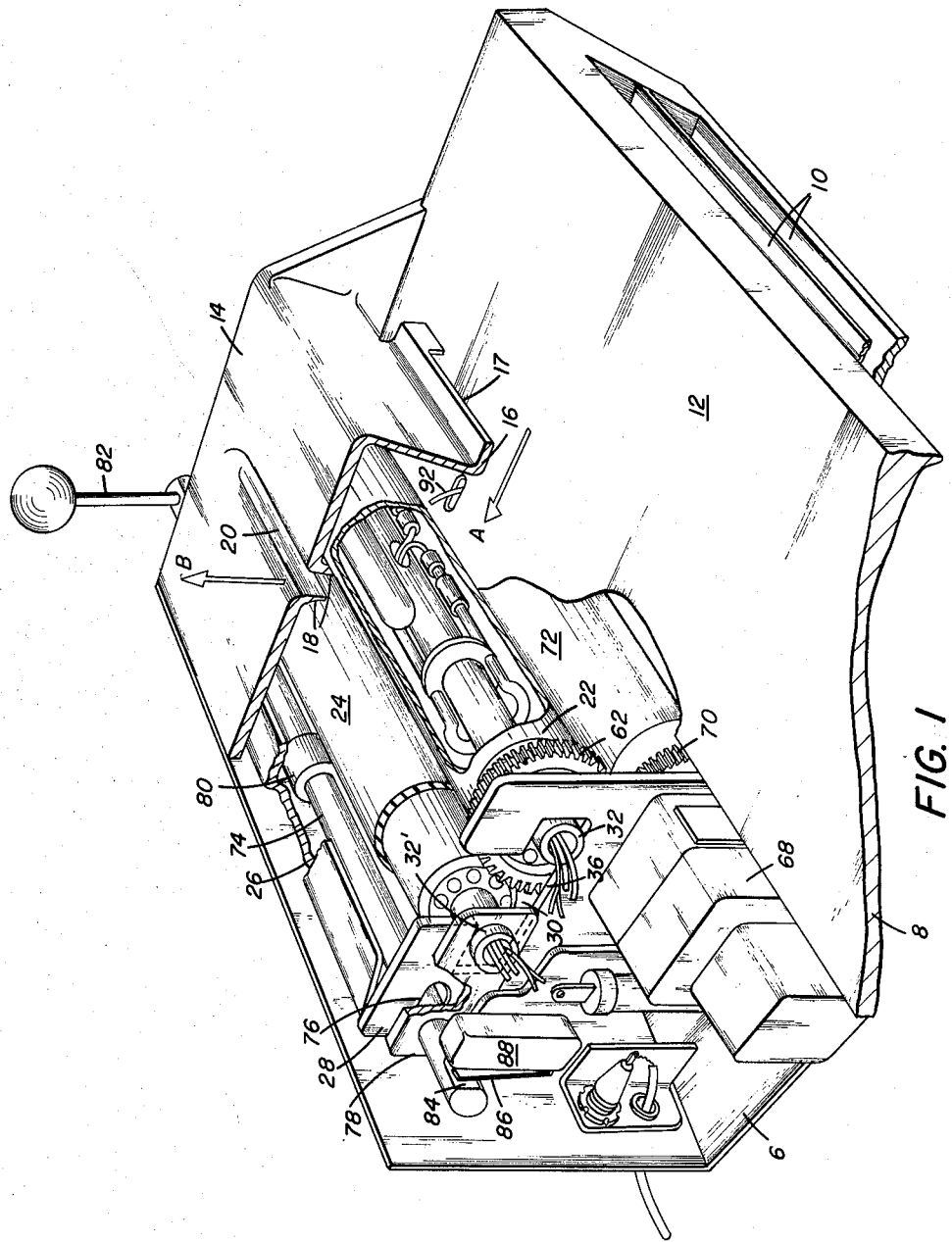

July 12, 1966  R. W. VREELAND ETAL  3,260,197
PRESSURE ROLLER COPY-MAKING MECHANISM
Filed May 1, 1964  2 Sheets-Sheet 1

ROBERT W. VREELAND
JOHN KUCHMY
WILBUR D. ROBINSON
INVENTORS

BY
ATTORNEYS

July 12, 1966 R. W. VREELAND ETAL 3,260,197
PRESSURE ROLLER COPY-MAKING MECHANISM
Filed May 1, 1964 2 Sheets-Sheet 2

ROBERT W. VREELAND
JOHN KUCHMY
WILBUR D. ROBINSON
INVENTORS

BY R. Frank Smith

Steve W. Grembow
ATTORNEYS

United States Patent Office 3,260,197
Patented July 12, 1966

3,260,197
PRESSURE ROLLER COPY-MAKING MECHANISM
Robert W. Vreeland, John Kuchmy, and Wilbur D. Robinson, Rochester, N.Y., assignors to Eastman Kodak Company, Rochester, N.Y., a corporation of New Jersey
Filed May 1, 1964, Ser. No. 364,106
6 Claims. (Cl. 101—132)

This invention relates generally to copy-making apparatus, and more specifically to a pressure roller copy-making mechanism for making copies from an exposed matrix which is placed in superimposed relation with a copy sheet to form a copy sheet-matrix or two-ply sandwich, and the sandwich fed through the mechanism where it is subjected to heat and pressure.

The use of pressure rollers in a copy-making apparatus between which a copy sheet-matrix sandwich may be transported for transferring an image from the matrix onto the copy-sheet is well known in the art. With certain matrix materials, in order to achieve an adequate image transfer onto a copy-sheet, it is necessary to subject the matrix and copy sheet sandwich to a substantial pressure and temperature. In a pressure roller mechanism of this type, one of the rollers is normally constructed of metal, while the mating roller is covered with a suitable thickness of resilient material. Also, means are provided to urge the rollers together with a relatively large force on the order of 50 pounds per inch of roll length, and this force must be essentially uniform from one end of the roller to the other. In the past, difficulty has been encountered in maintaining a uniform pressure between the rollers across their entire length. Also, in such pressure roller mechanisms, both of the rollers must be heated to a temperature on the order of 165° F. with a permissible tolerance of plus or minus 10° F. In the past, difficulty has been encountered in maintaining the temperature of the rollers within a narrow predetermined range within which good copies can be made. This difficulty has been compounded by the fact that the cooler copy sheet-matrix sandwich introduced between the rollers may reduce the temperature of the rollers to a point where inadequate copies will be produced. This is particularly troublesome where multiple copies are made. Applicants' improved pressure roller copy-making device is believed to obviate these difficulties, and other disadvantages of prior known devices.

Therefore, one of the objects of the present invention is to provide an improved pressure roller copy-making mechanism in which the temperature of the pressure rollers is maintained within a narrow predetermined range, and the pressure between the rollers is maintained substantially uniform throughout the entire length of the rollers.

Another object of this invention is to provide an improved pressure roller copy-making mechanism having a simple, heat compensating system for maintaining the temperature of the pressure rollers within a narrow predetermined range.

Another object of this invention is to provide an improved pressure roller copy-making mechanism in which moving a handle to place the rollers under pressure also energizes the motor for driving the pressure rollers.

Another object of the invention is to provide an improved pressure roller copy-making mechanism in which the introduction of a copy sheet-matrix sandwich into the mechanism automatically turns on the heater whether the thermostat calls for heat or not.

Figure 2:
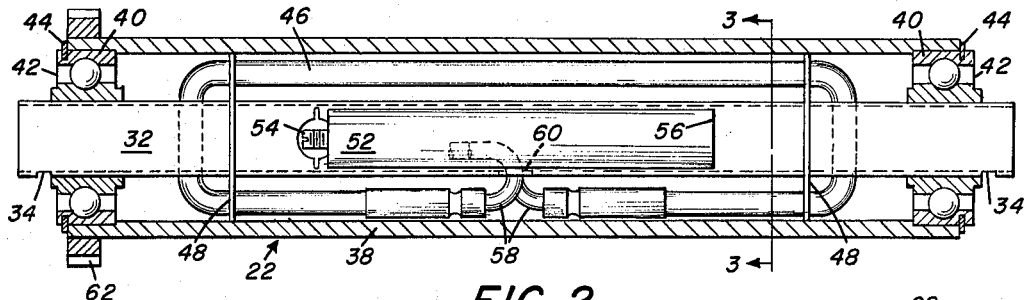
Figure 5:
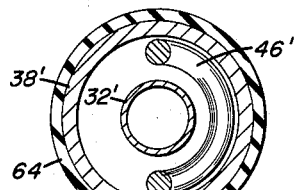
Figure 3:
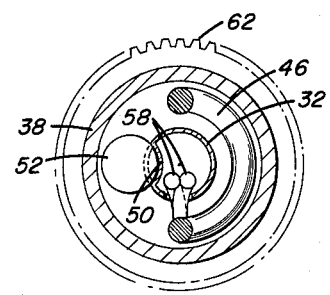
Figure 4:
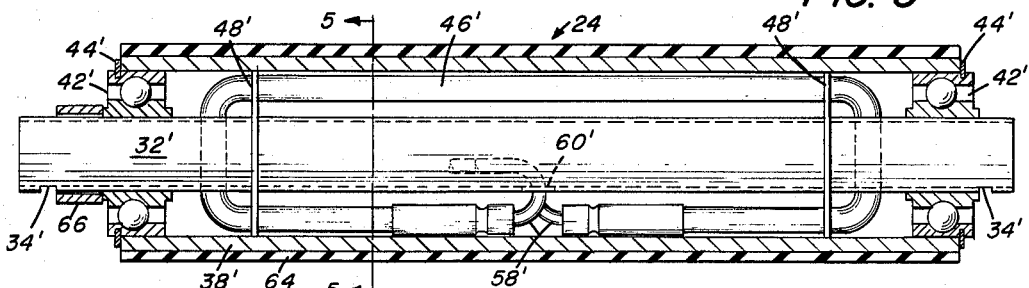
Figure 6:
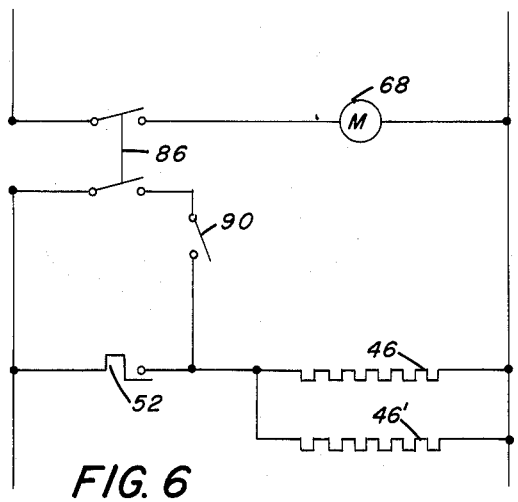

Objects and advantages other than those set forth above will be apparent from the following description when read in connection with the accompanying drawings, in which:
FIG. 1 is a perspective view of a pressure roller copy-making mechanism constructed in accordance with a preferred embodiment of the present invention, and with portions broken away and sectioned for purposes of clarity;
FIG. 2 is a longitudinal section view of one of the pressure rollers shown in FIG. 1;
FIG. 3 is a cross-section view taken along line 3—3 of FIG. 2;
FIG. 4 is a longitudinal section view of the other roller disclosed in FIG. 1;
FIG. 5 is a cross-section view taken along line 5—5 of FIG. 4; and
FIG. 6 is a schematic electrical wiring diagram for the pressure roller copy-making mechanism of this invention.

As shown in the drawings, the pressure roller copy-making mechanism of this invention comprises a base 6 having mounted thereon a housing 8 formed of any suitable material such as metal or plastic. The housing 8 contains storage shelves 10 for matrices and copy sheets and forms a platform 12 for supporting a copy sheet-matrix sandwich, not shown. A decorative and heat-confining cover 14 is secured to housing 12, and has one wall 16 thereof spaced apart from the platform 12 to form an opening 17 through which a copy sheet-matrix sandwich may be inserted into the mechanism in the direction of arrow "A" as seen in FIG. 1. The cover 14 has depending lips 18 defining an elongated opening 20 in register with the nip of a pair of opposed pressure rollers 22, 24. The lips 18 extend almost to the periphery of rollers 22, 24 for guiding a copy sheet-matrix sandwich through opening 20 and in the direction of the arrow "B" shown in FIG. 1 after it has passed between rollers 22, 24. Since rollers 22, 24 are similar in construction, parts designated in roller 22 by a numeral will hereafter be designated in roller 24 by the same numeral primed.

A rigid U-shaped frame member 26 is mounted on base 6 and the end plates 28 thereof, only one of which is shown, have inverted T-shaped notches 30 extending from the upper edge thereof, for slidably supporting the ends of hollow, pressure roller shafts 32, 32'. The shafts have slots 34, 34' (see FIGS. 2 and 4) adjacent each end thereof cooperating with an edge 36 of T-shaped notches 30 for confining shafts 32, 32' against axial movement and preventing rotation thereof. The shafts 32, 32' further rotatably support the aforementioned pressure rollers 22, 24.

The roller 22 as best seen in FIGS. 2 and 3, comprises an aluminum cylinder 38 having a press fit relation with the outer races 40 of ball bearings 42, the inner race of which is secured to each end of shaft 32. Retainers 44 cooperating with grooves in races 40 prevent possible axial movement of cylinder 38. An arcuately shaped resistance heater 46, such as a Calrod heater, is disposed in the annular space between shaft 32 and cylinder 38, and is rigidly secured to shaft 32 by means of a pair of heat-resistant asbestos disks 48 which position the heater element 46 out of contact with shaft 32 and cylinder 38. The shaft 32 further has a peripheral groove 50 (see FIG. 3) therein for receiving a heat sensitive switch or thermostat 52 secured thereto by a set screw 54 which urges one end of switch 52 against a shoulder 56 of groove 50. In this position, thermostat 52 is out of engagement with both the cylinder 38 and heater element 46. The electrical wires 58 for heater 46 pass through an opening 60 in hollow shaft 32, and exit from the center of shaft 32 as seen in FIG. 1. A gear 62 is mounted on one end of cylinder 38 for a purpose to be explained hereinafter.

Roller 24 differs from roller 22 in that a switch and gear similar to switch 52 and gear 62 are omitted, and its cylinder 38' is covered with a resilient material 64 such as Neoprene. The shaft 32' of roller 24 further has an annular spacer element 66 mounted at one end to properly position the roller between side plates 28.

The drive mechanism for the pressure rollers comprises a drive motor 68 (see FIG. 1) for driving a shaft to which is secured a drive gear 70. The drive gear 70 is in meshing engagement with the aforementioned gear 62 for driving roller 22. Roller 22 imparts rotation to roller 24 when the two are in pressure engagement, and roller 22 is driven by drive motor 68. An idler guide roller 72 is rotatably supported by any suitable means, not shown, in peripheral engagement with roller 22. The guide roller 72 cooperates with roller 22 and any suitable deflector, not shown, to feed a copy sheet-matrix sandwich into the nip of rollers 22, 24 upon rotation of the rollers by drive motor 68.

A pressure mechanism movable between an operative position, in which rollers 22, 24 are urged into pressure engagement, and an inoperative position, in which rollers 22, 24 are out of pressure engagement, comprises a shaft 74 extending through elongated openings 76 in side plates 28, and circular openings in the ends of a pair of compression links 78, only one of which is shown in FIG. 1. The opposite ends of links 78 have openings through which the ends of hollow shaft 32' extend. The shaft 74 has a cam 80 secured midway of its ends cooperating with rigid frame 26 for moving shaft 74 away from frame 26 upon rotation of the shaft between "on" and "off" positions by means of a handle 82 secured to one end of shaft 74. Initial movement of shaft 74 is transmitted via links 78 to each end of roller shaft 32' for urging it into pressure engagement with roller 22. Continued movement of shaft 74 to its "on" position results in a deflection of shaft 74 by virtue of the cam 80 and frame 26 coaction for applying equal force to each end of roller shaft 32'. The cam 80 in this instance is shown as cylindrical with a flattened portion on one side to provide a definite on-off control. If desired, the cam 80 may constitute a cylindrical member mounted eccentrically of shaft 74. The outer end of shaft 74 also has a flattened portion 84 cooperating with an actuating element 86 of an electrical switch 88 for connecting and disconnecting the power to drive motor 68. The actuating element 86 is spring biased against the periphery of shaft 74, and in the "off" or "inoperative" position of the pressure mechanism, the switch 88 is open, and is automatically closed when the pressure mechanism is moved by handle 82 to the "on" or "operative" position.

With respect to the electrical wiring diagram shown in FIG. 6, and as indicated heretofore, drive motor 68 is controlled by switch 86 which is responsive to the movement of the pressure mechanism between its operative and inoperative positions by handle 82. Movement of the pressure mechanism to its "operative" position, simultaneously moves pressure rollers 22, 24 into pressure engagement, and closes switch 86 to connect the power to a switch 90 in series with heaters 46, 46', and to actuate drive motor 68 for driving rotor 22. The roller 22, in turn, imparts rotation to rollers 24, 72 for feeding material introduced through opening 17 into the nip of rollers 22, 24. Also, the current to the heaters 46, 46' in rollers 22, 24 is controlled by the aforementioned thermostat 52 located within roller 22. The aforementioned switch 90 has an actuating element 92 (see FIG. 1) which is tripped by a copy sheet-matrix sandwich as it is inserted through opening 17 into the nip of rollers 22, 24 to connect the power supply to heaters 46, 46' regardless of whether thermostat 52 is open or closed (see FIG. 6). This paper sensing circuit is designed to supply approximately the same amount of heat to rollers 22, 24 that is carried away therefrom by the cooler copy sheet-matrix sandwich being fed into the machine.

The invention has been described in detail with particular reference to a preferred embodiment thereof, but it will be understood that variations and modifications can be effected within the spirit and scope of the invention as described hereinabove and as defined in the appended claims.

We claim:

1. In a copy-making mechanism for pressing together a two-ply sandwich such as a copy-sheet and matrix to produce a copy upon separation of the two, the combination comprising:

a frame member having a rigid back plate;

a first roller rotatably supported by said frame member;

activatable means for rotatably driving said first roller;

said activatable means including a motor and a first switch in circuit with said motor for activating or deactivating same;

a second roller supported by said frame member for rotation about an axis substantially parallel to the axis of said first roller and for transverse movement to and from rolling engagement with said first roller;

movable means connected to said second roller and movable between an inoperative position, in which said driving means is deactivated and said second roller is held out of rolling pressure engagement with said first roller, and an operative position, in which substantially simultaneously said activatable means is activated to drive said first roller, and said second roller is urged into rolling pressure engagement with said first roller for pressing together and advancing a two-ply sandwich fed into the nip of said rollers;

said movable means comprising a rotatable shaft, linking elements each having one end loosely mounted on said rotatable shaft and its opposite end secured to one end of said second shaft, a first cam on said rotatable shaft midway of said elements and cooperating with said back plate upon rotation of said rotatable shaft for moving said movable means between said operative and inoperative positions, and a second cam on said rotatable shaft for operating said first switch.

2. In a copy-making mechanism for pressing together a two-ply sandwich such as a copy-sheet and matrix to produce a copy upon separation of the two, the combination comprising:

a frame member;

a first roller rotatably supported by said frame member;

activatable means for rotatably driving said first roller;

a second roller supported by said frame member for rotation about an axis substantially parallel to the axis of said first roller and for transverse movement to and from rolling engagement with said first roller;

said first and second rollers each comprising a cylinder surrounding one of said shafts, a heating element interposed between said cylinder and said shaft, and means for mounting said heating element so that it is out of contact with said cylinder and said one shaft;

one of said first and second rollers having a heat responsive switch means in circuit with said heating elements and secured to the shaft of said one roller out of contact with said heating element and said cylinder; and means connected to said second roller and movable between an inoperative position, in which said driving means is deactivated and said second roller is held out of rolling pressure engagement with said first roller, and an operative position, in which substantially simultaneously said activatable means is activated to drive said first roller, and said second roller is urged into rolling pressure engagement with said first roller for pressing together and advancing a two-ply sandwich fed into the nip of said rollers.

3. The invention according to claim 2 and further including entry means along which a two-ply sandwich may be fed into said mechanism, and a second switch in series with said heating elements and in parallel with said heat responsive switch, said second switch having a part thereof extending into said entry means, and further being responsive to the introduction of a two-ply sandwich into the mechanism for turning on said heating elements before said sandwich is fed into the nip of said rollers.

4. In a copy-making mechanism for pressing together a two-ply sandwich such as a copy-sheet and matrix to produce a copy upon separation of the two, the combination comprising:

a frame member having a rigid back plate and a pair of spaced apart side plates, each of said side plates having an inverted T-shaped notch extending from one edge thereof which are in alignment with one another, each T-shaped notch having a vertical portion and a horizontal portion;

a first shaft having its opposite ends received by corresponding ends of the horizontal portions of said notches and rotatably supporting a first roller;

a second shaft parallel to said first shaft for rotatably supporting a second roller, and having its opposite ends slidably received by said corresponding opposite ends of said notches for movement of said second roller to and from rolling control with said first roller;

said first and second rollers each comprising a cylinder surrounding one of said shafts, a heating element interposed between said cylinder and said shaft, and means for mounting said heating element so that it is out of contact with said cylinder and said one shaft;

means for rotatably driving said first roller; and movable means connected to the ends of said first shaft and movable between an inoperative position, in which said second roller is moved out of rolling pressure engagement with said first roller, and an operative position, in which said second roller is urged into pressure engagement with said driven first roller for pressing together a two-ply sandwich fed into the nip of said rollers.

5. The invention according to claim 4 wherein one of said first and second rollers has a heat responsive switch in series with said heating elements and secured to the shaft of said one roller out of contact with said heating element and said cylinder.

6. The invention according to claim 5 and further including entry means along which a two-ply sandwich may be fed into said mechanism, and a first switch in series with said heating elements and in parallel with said heat responsive switch, said first switch having a part thereof extending into said entry means, and responsive to the introduction of a two-ply sandwich into the mechanism for turning on said heating elements before said sandwich is fed into the nip of said rollers.

References Cited by the Examiner

UNITED STATES PATENTS

| | | | |
|---|---|---|---|
| 1,560,989 | 11/1925 | Hedglow | 38—50 |
| 2,934,007 | 4/1960 | Francis et al. | 101—131 |

EUGENE R. CAPOZIO, *Primary Examiner.*